United States Patent
Couture

[19]

[11] Patent Number: 5,431,091
[45] Date of Patent: Jul. 11, 1995

[54] COMBINED UNIT FOR COOKING, HEATING AND/OR GRATINATING FOOD

[76] Inventor: Léonard Couture, St.-Hubert, Canada

[21] Appl. No.: 74,817

[22] PCT Filed: Dec. 4, 1991

[86] PCT No.: PCT/CA91/00432

§ 371 Date: Feb. 16, 1994

§ 102(e) Date: Feb. 16, 1994

[87] PCT Pub. No.: WO92/10126

PCT Pub. Date: Jun. 25, 1992

[30] Foreign Application Priority Data

Dec. 11, 1990 [GB] United Kingdom ............... 9026903

[51] Int. Cl.⁶ .................... A47J 36/26; A47J 39/02
[52] U.S. Cl. ........................ 99/401; 99/448; 99/447; 99/425; 126/43; 126/275 R
[58] Field of Search ............. 99/339, 448, 401, 447, 99/422, 425; 126/43, 275 R, 273 R

[56] References Cited
U.S. PATENT DOCUMENTS 3,079,855  3/1963  Valis ............................. 99/425
3,785,274  1/1974  Yamamoto ...................... 99/425
3,847,068  11/1974 Beer et al. ..................... 99/425
4,320,736  3/1982  Sharon ........................ 126/275 R

FOREIGN PATENT DOCUMENTS 0054160  6/1982  European Pat. Off. .......... 99/448
0139885  5/1985  European Pat. Off. .
2614400  10/1988 France .
595818   2/1978  Switzerland .
609854   3/1979  Switzerland .

*Primary Examiner*—David A. Scherbel
*Assistant Examiner*—Reginald L. Alexander
*Attorney, Agent, or Firm*—Dvorak and Traub

[57] ABSTRACT

A combined unit for cooking, heating and/or gratinating food comprises a support member (12) on which rests a pair of vertically spaced plates (20, 26). The lower plate (20) is adapted to receive food to be gratinated while the upper plate (26) is adapted to receive food to be cooked and/or heated. The unit comprises means (36) for deflecting heat over the food on the lower plate and under the upper plate to cook and/or heat thereon.

7 Claims, 3 Drawing Sheets

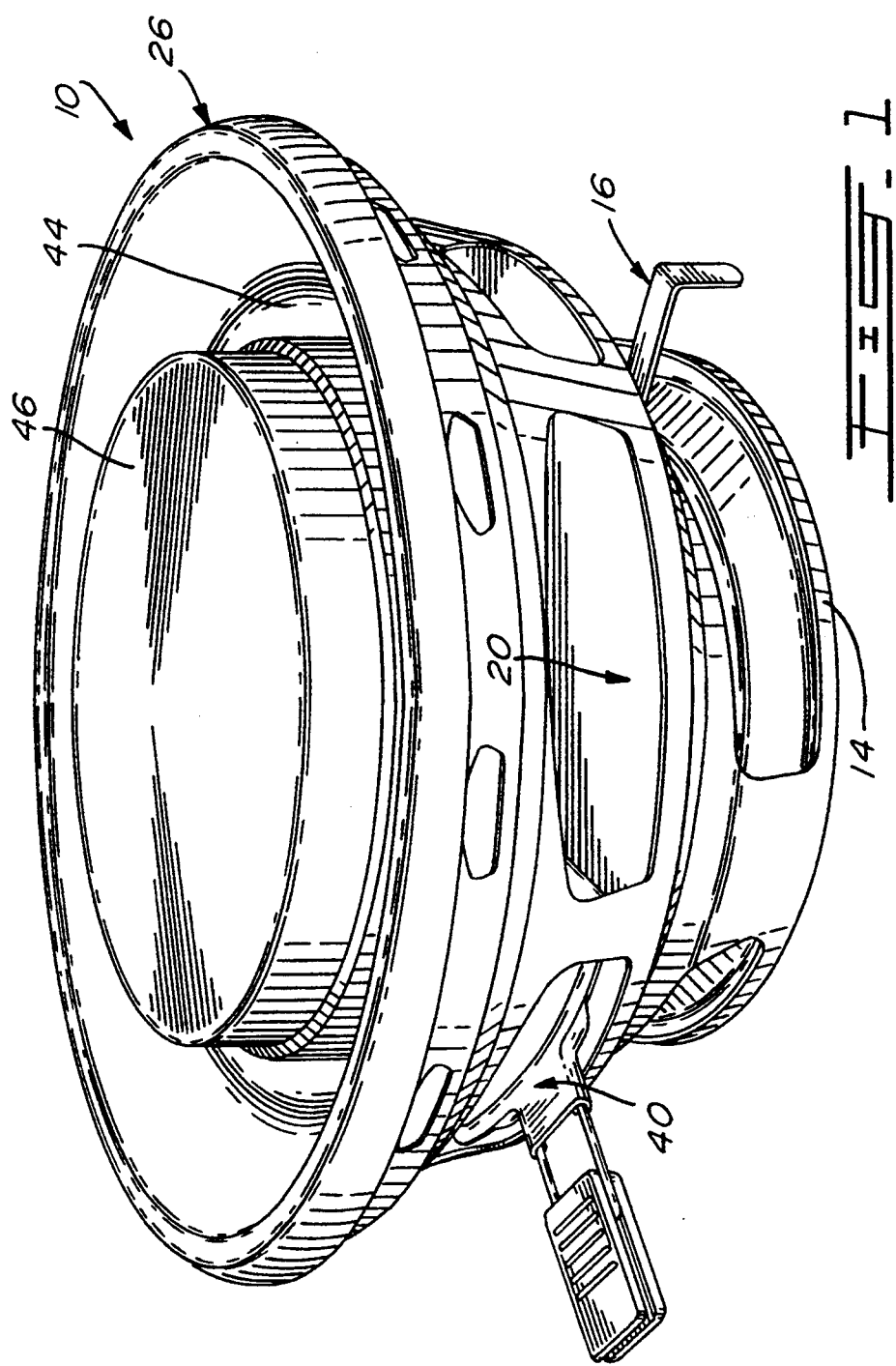

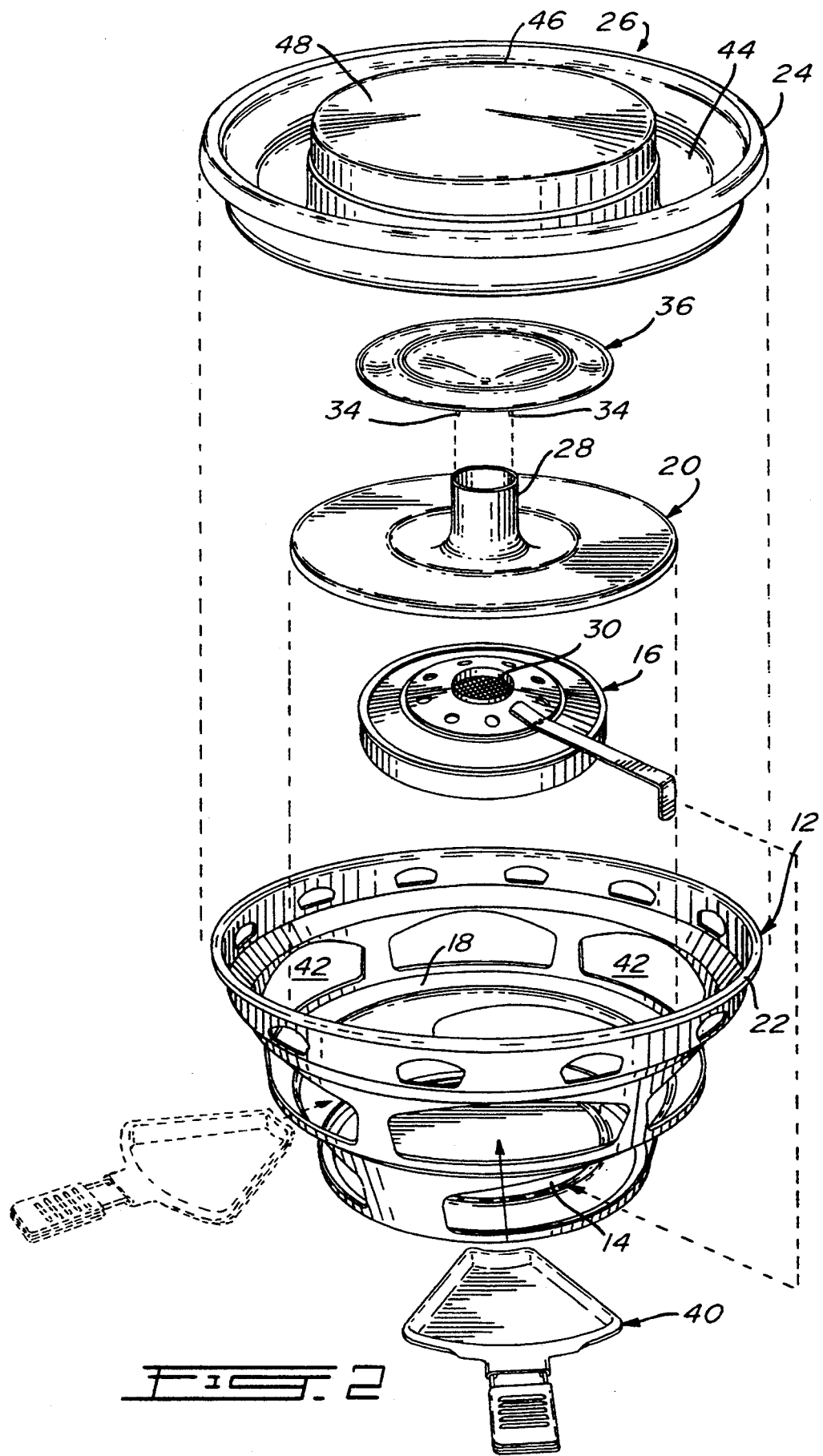

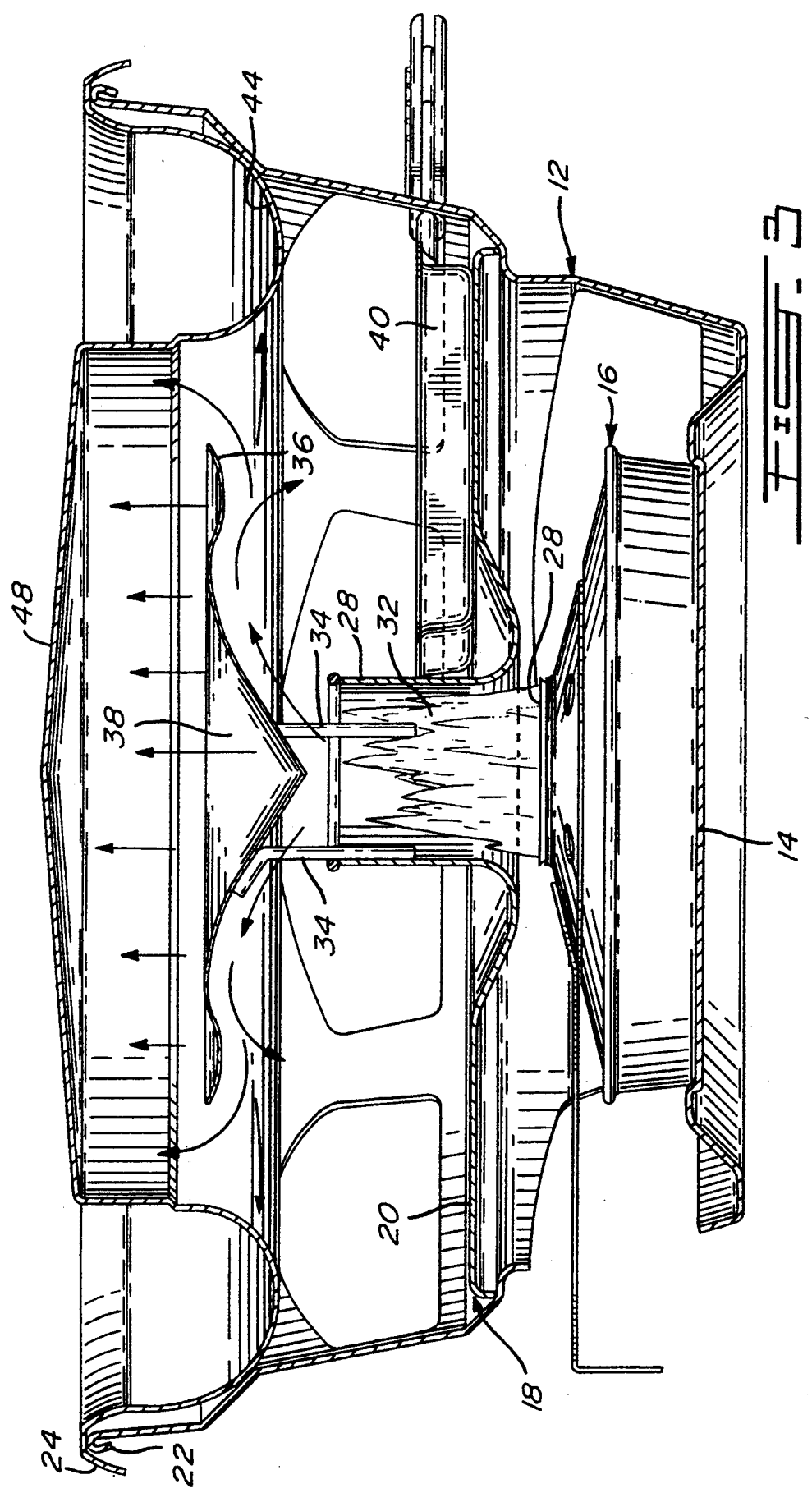

COMBINED UNIT FOR COOKING, HEATING AND/OR GRATINATING FOOD

The present invention relates to a combined unit for cooking, heating and/or gratinating food.

It is an object of the present invention to provide a compact unit which can be used as a hot plate, a fondue recipient or to receive a dish, usually known as "raclette", wherein food is placed in small pans with thin slices of cheese placed thereon and wherein heat thereover gratinates the cheese.

The present invention relates to a combined unit for cooking, heating and/or gratinating food which comprises:
  a support member;
  a first plate supported on the member and adapted to receive thereon food to be gratinated;
  a second plate supported on the member and mounted above the first plate, and being adapted to receive thereon food to be cooked and/or heated; and
  means providing heat between the first plate and the second plate for cooking and or heating food on the second plate and for gratinating food on the first plate.

In one preferred form of the invention, the heat between the two plates consists of flames which are deflected by a third plate situated between the first and second plates, the flames being deflected over the lower plate and then directed under the upper plate.

In a further embodiment of the invention, the flames originate from a heat source located beneath the lower plate, the latter being provided with a chimney-like construction so that the flames may pass through the chimney to contact and be deflected by the intermediate third plate.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

FIG. 1 is a top perspective view of a combined unit made in accordance with the present invention;

FIG. 2 is an exploded view showing the various components of the combined unit; and FIG. 3 is an elevation cross-sectional view of the combined unit.

Referring to the drawings, there is shown a combined unit, generally denoted 10, for cooking, heating and/or gratinating food. The combined unit comprises a support member 12 having a bottom wall 14 on which rests a burner 16 which may be alcohol based. The member has an inverted frusto-conical shape with an internal intermediate circumferential shoulder 18 on which rests the circumferential edge of a first plate 20. Support member 12 displays an upper circumferential edge 22 on which rests the circumferential inverted U-shaped edge 24 of an upper plate 26.

The first plate 20 has a central cylindrically shaped upper projection 28 defining a chimney. As illustrated in FIG. 3, the chimney is located coaxially with a circular central opening 30 of the burner 16 so that the flames 32 may pass therethrough.

Tightly contained within the chimney-like element 28 is a plurality of legs 34 (preferably three) fixedly secured to a deflecting plate 36, preferably having a conically shaped central portion 38 so that the flames move upward, they are deflected radially beneath the plate 36.

On plate 20, is disposed a series of food receiving pans 40 which are inserted laterally through appropriate openings 42 in the sidewall of the support member 12.

The upper plate 26 comprises, adjacent edge 24, an annular concavity 44 which is used to receive fondues, cooking oils, sauces or the like. The central portion 46 of the upper plate includes a convex upper surface 48 which acts as a hot plate for cooking or heating food.

Referring to FIG. 3, when the burner 16 is lit, flames 32 moving upward through the chimney 28, contact the conical portion 38 of the intermediate plate 36 and more radially over the food in the pans 40. Then, the flames continue upwardly under the surface 48 and around the concave recess 44.

Although the invention has been described above in relation to one specific form, it will be evident to a person skilled in the art that it may be modified and refined in various ways. For example, the heating means could be constructed differently, such as an electrical element so disposed between the upper and lower plates as to direct heat over the food to be gratinated on the lower plate and then under the upper plate on which food will be cooked and/or heated. It is therefore wished to have it understood that the present invention should not be limited in interpretation, except by the terms of the following claims.

The embodiments of the invention in which an exclusive property or privilege is claimed are defined as follows:

1. A combined unit for cooking, heating and/or gratinating food, comprising:
  a support member;
  flame heating means mounted at a bottom of said support member;
  a first plate supported on said support member, and disposed above said flame heating means, said first plate having a projection extending from a central portion thereof to define a passage means therein allowing flames from said heating means to pass through said passage means of said first plate;
  a circular flame deflecting plate mounted above said projection extending from said first plate, said circular flame deflecting plate being seperated from said projection by a leg extending from said circular flame deflecting plate and connected to said projection; and
  a second plate supported on said support member above said circular flame deflecting plate, wherein flames passing through said passage means of said projection are deflected by said circular deflecting plate and directed over said first plate for gratinating food dishes disposed on said first plate, and the flames are further directed under said second plate for cooking and/or heating food on said second plate.

2. A combined unit as defined in claim 1, wherein said second plate is circular in shape and includes a convex central portion for receiving food to be cooked and an annular peripheral concave portion to heat food placed therein.

3. A combined unit as defined in claim 2, wherein said second plate has a circumferential edge resting on a circumferential edge of said support member.

4. A combined unit as defined in claim 1, wherein said flame heating means consists of an alcohol based fuel burner.

5. A combined unit as defined in claim 4, further comprising a third plate at the bottom of said support member to receive thereon said flame heating means.

6. A combined unit as defined in claim 1, wherein said support member has an inverted frustoconical shape, a side wall of which includes circumferentially spaced openings allowing individual food-containing pans to be inserted and placed on said first plate whereby flames circulating thereover gratinate food in said pans.

7. A combined unit as defined in claim 1, wherein said circular flame deflecting plate has an inverted conical shaped central area.

* * * * *